United States Patent Office 3,725,273
Patented Apr. 3, 1973

3,725,273
GREASE COMPOSITION
John B. Christian, Yellow Springs, Ohio, assignor to the United States of America as represented by the Secretary of the Air Force
No Drawing. Filed Dec. 3, 1969, Ser. No. 881,918
Int. Cl. C10m 7/50, 7/28
U.S. Cl. 252—13                                    3 Claims

ABSTRACT OF THE DISCLOSURE

A grease composition consisting essentially of methylphenyldimethyl polysiloxane fluid containing iron octoate as an antioxidant and thickened with asbestos, fluorinated ethylenepropylene copolymer, and ammeline.

This invention relates to a grease composition in which a polyorganosiloxane is the base fluid and which contains a novel combination of thickening agents. In one aspect it relates to a lubricant grease which is operable over a wide temperature range in providing lubrication to high speed antifriction bearings.

Organosiloxanes are disclosed in the prior art as being suitable base fluids for preparing grease-type lubricants. These base fluids utilize a variety of thickening agents, including carbon black, triazine compounds, Cab-O-Sil silica powder, aryl substituted ureas, and boron nitride. While such greases have generally been acceptable for high temperature applications because of the resistance of the base fluid to thermal degradation, they have not been entirely satisfactory for use at low temperatures.

It is an object of this invention, therefore, to provide a grease that is operable over a wide temperature range, e.g., from —65° F. and below to 500° F. and above.

Another object of the invention is to provide a lubricant grease that is suitable for use in lubricating high speed, antifriction bearings which are required to operate under high speed and light load conditions.

Still another object of the invention is to provide a grease composition that is particularly useful as an airframe and wheel bearing lubricant, such as is required on supersonic aircraft.

Other objects and advantages of the invention will become apparent to those skilled in the art upon consideration of the accompanying disclosure.

Broadly speaking, the present invention resides in a grease composition consisting essentially of (1) a polyorganosiloxane fluid, (2) 2,4-diamino - 6 - hydroxy-1,3,5-triazine (ammeline), (3) fluorinated ethylenepropylene resin, and (4) asbestos. It has been discovered that the polyorganosiloxane fluid containing the indicated combination of three additive materials provides a grease composition that performs outstandingly over a wide temperature range.

In a preferred embodiment, the grease composition of this invention consists essentially of (1) 68 to 72 weight percent of a methylphenyldimethyl polysiloxane fluid containing an oxidation inhibitor (2) 8 to 12 weight percent of ammeline, (3) 18 to 22 weight percent of fluorinated ethylene propylene resin, and (4) 0.5 to 2.5 weight percent of asbestos, based on a total of 100 weight percent. An especially desirable composition consists essentially of (1) 68.5 weight percent of the inhibited polyorganosiloxane, (2) 10.0 weight percent of ammeline, (3) 21.0 weight percent of fluorinated ethylenepropylene copolymer, and (4) 0.5 weight percent of asbestos.

The grease compositions of this invention have the following desirable properties:

Penetration, 0 stroke _____ 313–321
Penetration, 60 strokes _____ 362–364
Penetration, 10,000 strokes _____ 362–369
Spindle test, 400° F., 5 lb. load, 10,000 r.p.m., hours _____ 3000–3050
Spindle test, 450° F., 5 lb. load, 10,000 r.p.m., hours _____ 1000–1100
Spindle test, 500° F., 5 lb. load, 10,000 r.p.m., hours _____ 580–660

The foregoing data are based on tests conducted in accordance with Federal Test Method Standard No. 791a. Penetrations were determined using Method 313.2 while the spindle tests were carried out according to Method 333.

The polyorganosiloxane base fluid has a maximum pour point of about —85° F. and a minimum flash point in the approximate range of 600 to 640° F. A preferred fluid is a methylphenyldimethyl polysiloxane and a particularly preferred member of this class of siloxanes is one having the following general formula:

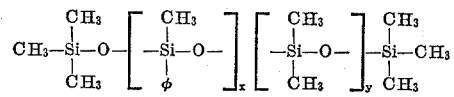

wherein $\phi$ represents a phenyl group, $x$ represents 25 mol percent of $(CH_3\phi)SiO$ units, $y$ represents 60 mol percent of $(CH_3)_2SiO$ units, and 15 mol percent of $(CH_3)SiO_{1/2}$ units as endblockers. The polyorganosiloxane according to the above formula has the following properties:

Viscosity at 77° F. _____ centistokes__ 86.6
Viscosity at 100° F. _____ do____ 60.1
Viscosity at 210° F. _____ do____ 20.9
Viscosity at 0° F. _____ do____ 455.1
Viscosity at —40° F. _____ do____ 1776
Viscosity at —65° F. _____ do____ 5775
Density at 77° F. _____ g./cc__ 1.0160
Refractive Index at 77° F. _____ 1.4569
Flash point _____ ° F__ 640
Pour point _____ ° F__ —85

The polyorganosiloxane fluid as used in the present composition contains an oxidation inhibitor which is preferably an iron compound. Preferred stabilizers are iron oxide and the iron salts of carboxylic acids which may be saturated or unsaturated, cycloaliphatic or aromatic acids. Examples of suitable compounds are iron salts of acetic, propionic, butyric, 2-ethyl-hexanoic, benzoic, toluic, cyclohexanoic acids and the like. A preferred stabilizer is iron octoate. The amount of oxidation inhibitor can vary within rather broad limits but is usually in the range of 0.1 to 5 weight percent, preferably 0.2 to 1 and more desirably 0.25 weight percent, based on a total of 100 weight percent of polyorganosiloxane fluid plus oxidation inhibitor. For example, a composition may contain 70 percent by weight of a base fluid containing from 99.9 to 95 weight percent of polyorganosiloxane and 0.1 to 5 weight percent of the iron compound.

The grease composition of this invention includes three additive materials which function as thickening agents. It was completely unexpected when it was discovered that the combination of materials when used in admixture with a base fluid as described above resulted in a grease that provides lubrication to high speed antifriction bearings that are required to operate at temperatures up to 500° F. and higher while at the same time being able to operate at temperatures as low as —65° F.

The ammeline, which is used in finely divided form, preferably has a density of about 1.7121 g./cc. The average particle size of the ammeline generally ranges from about 0.85 to 1.5 micron with a 0.9 micron diameter being preferred. The surface area of the particles usually falls in the range of about 3.5 to 4.9 square meters per gram.

The fluorinated ethylene propylene resin is a copolymer of perfluoropropylene and tetrafluoroethylene. Equimolar amounts of the perfluoropropylene and tetrafluoroethylene are generally used in the polymerization so that the resulting copolymer has the following formula:

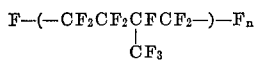

The $n$ in the formula is of such a value that the copolymer has a molecular weight in the range of 120,000 to 190,000 preferably between about 140,000 and 160,000 Advantageously, the molecular weight is such as to provide a copolymer having a density ranging from 2.391 to 2.467 g./cc. The copolymer is used in finely divided form with the particles having a diameter in the approximate range of 0.05 to 0.25 micron and a minimum surface area of about 1.0 square meter per gram. However, particles having a surface area as great as 3.0 square meters per gram can be utilized in preparing the composition.

The asbestos, which is also in finely divided form, preferably has a density in the approximate range of 2.390 to 2.470 g./cc. The asbestos particles are fibrous and usually have a diameter of about 150 to 300 A. and a length of about 1000 to 2000 A. The surface area of the particles is generally in the approximate range of 45 to 55 square meters per gram. As noted hereinbefore the amount of asbestos used in the composition ranges from 0.5 to 2.5 weight percent. It is critical that the composition contain an amount of asbestos falling in this range. It has been found that less than 0.5 weight percent does not provide sufficient thickening while with amounts greater than 2.5 weight percent there is a sacrifice of lubrication properties.

The grease composition can be prepared by mixing the several ingredients by methods that are well known in the art. In one method the ingredients are mixed for about ten minutes in a vessel provided with a mechanical stirrer. The resulting slurry is then passed a number of times, e.g., 5 to 10 times, through a 3-roll paint mill with roller openings set at about 0.002 inch. If the roller openings are pressure operated, then a pressure setting of 100 to 150 p.s.i. is satisfactory. Comparable results can be obtained by homogenizing the grease slurry in a homogenizer under a pressure of about 7000 p.s.i.

A better understanding of the invention can be obtained by referring to the following illustrative example which is not intended, however, to be unduly limitative of the invention.

EXAMPLE

A series of grease compositions was prepared by mechanically stirring the ingredients and then passing the resulting slurry through a 3-roll paint mill until homogeneous mixtures were obtained. In the following table compositions A, B, and C are greases of the present inventions while the other compositions are other greases that are included for comparative purposes. The amounts shown in the table are expressed in weight percentages.

TABLE

| Composition | A | B | C | D | E | F | G | H | I | J |
|---|---|---|---|---|---|---|---|---|---|---|
| Base fluid [1] | 70 | 68.5 | 68.5 | 80 | 83 | 92.8 | 50 | 44.7 | 64 | |
| Do.[2] | | | | | | | | | | 77.5 |
| Ammeline | 10.0 | 10.0 | 10.0 | | | | 50 | 55.3 | | 20.0 |
| FEP[3] | 19.5 | 21.0 | 21.0 | | | | | | | |
| Asbestos | 0.5 | 0.5 | 0.5 | | | | | | | |
| ASU[4] | | | | 20 | 10 | | | | | 2.5 |
| Cab-O-Sil | | | | | | 7.2 | | | | |
| Carbon black | | | | | 7 | | | | | |
| Boron nitride | | | | | | | | | 36 | |
| Penetration (unworked)[5] | 353 | 321 | 321 | 249 | 290 | 298 | 283 | 362 | 241 | 247.2 |
| Penetration (worked)[6] | 334 | 360 | 362 | 230 | 305 | 301 | 303 | 361.5 | 346 | 257.5 |
| Spindle test 350° F.[7] | | | | | | 16 | | | | |
| Spindle test 400° F | 3,048 | 3,000+ | | | | | | 64 | 81 | |
| Spindle test 450° F | | 1,059 | | 202 | 205 | | | | | 635 |
| Spindle test 500° F | 660 | 412 | 417 | | | | 129 | | | 284 |
| Spindle test 550° F | | | | | | | | | | 244 |
| Spindle test 600° F | | | | | | | 20 | 51 | | 183 |

[1] Dow Corning product—methylphenyldimethyl polysiloxane having the general formula shown hereinbefore.
[2] Dow Corning product having the following structural formula:

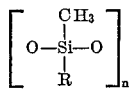

where R is a phenyl group, $n$ is an integer from 1 to 3 and —Si(CH₃) groups are chain stoppers.
[3] Fluorinated ethylenepropylene copolymer having an average molecular weight of about 150,000.
[4] Aryl-substituted urea.
[5,6,7] Tests conducted in accordance with Federal Test Method Standard No. 791a as indicated hereinbefore.

Compositions (A) through (I) were fluid at —65° F. whereas composition (J) prepared with a different base fluid solidified at 25° F. However, the spindle test properties of the compositions of the invention, namely A, B, and C, were greatly superior to the corresponding properties of the non-invention compositions.

As will be evident to those skilled in the art various modifications of this invention can be made in light of the foregoing disclosure without departing from the spirit or scope of the disclosure.

I claim:
1. A grease composition consisting of the following components in the indicated amounts:
 (1) 68 to 72 weight percent of a methylphenyldimethyl polysiloxane fluid having the following formula:

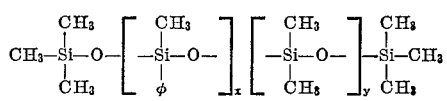

wherein $\phi$ represent a phenyl group, $x$ represents 25 mol percent of $(CH_3\phi)SiO$ units, $y$ represents 60 mol percent of $(CH_3)_2SiO$ units and 15 mol percent of $(CH_3)SiO_{1/2}$ units as endblockers, and said fluid has the following properties;

| | | |
|---|---|---|
| Viscosity at 77° F. | centistokes | 86.6 |
| Viscosity at 100° F. | do | 60.1 |
| Viscosity at 210° F. | do | 20.9 |
| Viscosity at 0° F. | do | 455.1 |
| Viscosity at −40° F. | do | 1776 |
| Viscosity at −65° F. | do | 5775 |
| Density at 77° F. | g./cc. | 1.0160 |
| Refractive Index at 77° F. | | 1.4569 |
| Flash point | ° F. | 640 |
| Four point | ° F. | −85 |

(2) 0.1 to 5 weight percent of iron octoate as an oxidation inhibitor for said fluid based on a total of 100 weight percent of said fluid plus oxidation inhibitor;

(3) 8 to 12 weight percent of 2,4-diamino-6-hydroxy-1,3,5-triazine;

(4) 18 to 22 weight percent of a fluorinated ethylene-propylene copolymer having the following formula:

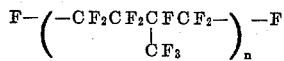

wherein $n$ is an integer such that the copolymer has a molecular weight in the range of 120,000 to 190,000; and (5) 0.5 to 2.5 weight percent of asbestos, components (1), (3), (4) and (5) being based on a total of 100 weight percent.

2. A composition according to claim 1 in which said 2,4-diamino-6-hydroxy-1,3,5-triazine is in the form of particles having a diameter in the range of about 0.85 to 1.5 micron and a surface area in the range of about 3.5 to 4.9 square meters per gram; said fluorinated ethylene-propylene copolymer is in finely divided form with particles having a diameter in the range of 0.05 to 0.25 micron and a minimum surface area of about 1.0 square meter per gram; and said asbestos is in the form of finely divided fibrous particles having a diameter of about 150 to 300 A. and a length of about 1000 to 2000 A. and a surface area in the range of about 45 to 55 square meters per gram.

3. A composition according to claim 2 in which said 2,4-diamino-6-hydroxy-1,3,5-triazine has a density of about 1.7121 g./cc.; said fluorinated ethylenepropylene copolymer has a density in the range of about 2.391 to 2.467 g./cc.; and said asbestos has a density in the range of about 2.390 to 2.470 g./cc.

References Cited

UNITED STATES PATENTS

| | | | |
|---|---|---|---|
| 2,984,624 | 5/1961 | Halter et al. | 252—18 |
| 3,010,896 | 11/1961 | Odell et al. | 252—18 |
| 3,424,678 | 1/1969 | Morway et al. | 252—13 |
| 3,248,326 | 4/1966 | Swenson | 252—58 |
| 2,445,567 | 7/1948 | Elliott | 252—49.6 |
| 2,890,170 | 6/1959 | Ragborg | 252—21 |
| 3,108,962 | 10/1963 | Buehler et al. | 252—35 |
| 3,639,237 | 2/1972 | Curtis | 252—13 |

OTHER REFERENCES

"Synthetic Lubricants" by Gunderson et al., 1962, pp. 274–276, 303, 316–319.

DANIEL E. WYMAN, Primary Examiner

I. VAUGHN, Assistant Examiner

U.S. Cl. X.R.

252—21, 28, 49.6